United States Patent [19]

Brink et al.

[11] Patent Number: 5,266,535
[45] Date of Patent: Nov. 30, 1993

[54] PROCESS FOR THE PRODUCTION OF SINTERING-ACTIVE $Si_3N_4$ POWDERS

[75] Inventors: Reinhold Brink, Meerbusch; Horst Lange, Bochum, both of Fed. Rep. of Germany

[73] Assignee: Bayer Aktiengesellschaft, Leverkusen, Fed. Rep. of Germany

[21] Appl. No.: 993,651

[22] Filed: Dec. 21, 1992

[30] Foreign Application Priority Data

Jan. 3, 1992 [DE] Fed. Rep. of Germany ....... 4200085

[51] Int. Cl.⁵ .............................................. C04B 35/58
[52] U.S. Cl. ...................................... 501/97; 423/344
[58] Field of Search ................... 501/97; 423/344, 353

[56] References Cited

U.S. PATENT DOCUMENTS

| | | | |
|---|---|---|---|
| 4,980,322 | 12/1990 | Wickel et al. | 501/97 |
| 4,983,371 | 1/1991 | Pitzer et al. | 423/344 |
| 5,126,295 | 6/1992 | Uchino et al. | 501/97 |

FOREIGN PATENT DOCUMENTS 3829503  8/1988  Fed. Rep. of Germany .

OTHER PUBLICATIONS

B. Hoffmann, Keramische, 40:90–92 (1988).
R. K. Iler, Chemistry of Silica, John Wiley & Sons, p. 40 (1979).
Ziegler et al., J. Mat. Sci. 22:3041–86 (1987).
DIN 66131, Oct. 1973.
DIN 66131, Nov. 1991.

*Primary Examiner*—Karl Group
*Assistant Examiner*—Chris Gallo
*Attorney, Agent, or Firm*—Connolly & Hutz

[57] ABSTRACT

A process is disclosed for producing sintering active silicon nitride powders with low oxygen content by wet grinding a silicon nitride starting material, leaching the ground suspension with fluorine-free mineral acid, and separating off the purified silicon nitride powder.

9 Claims, No Drawings

PROCESS FOR THE PRODUCTION OF SINTERING-ACTIVE SI₃N₄ POWDERS

This invention relates to a process for the production of sintering-active $Si_3N_4$ powders by mechanical preparation of $Si_3N_4$ starting material.

$Si_3N_4$ powders as a starting material for ceramic moldings have to meet very exacting requirements in regard to particle size distribution, granulometry, specific surface, oxygen content and chemical purity. The average particle size of these ceramic powders should be distinctly below 1 μm while their maximum particle size should be smaller than 5 μm. The specific surface of good $Si_3N_4$ powders is between 8 and 20 m²/g. Formation of the silicate melt phase during sintering presupposes a certain oxygen content during sintering of the powder although this oxygen content should not be present in the interior of the $Si_3N_4$ particles. On the other hand, the oxygen content should not be too high because high oxygen contents reduce strength at high temperatures [G. Ziegler, J. Heinrich, G. Wöttig, J. Mat. Sci. 22 (1987) 3041–86]. An oxygen content of up to 1.5% is regarded as optimal. The remaining chemical impurities should be negligible (<0.1%).

$Si_3N_4$ powders generally do not quite satisfy these requirements after their synthesis, which may be carried out for example by direct reaction of silicon with nitrogen or by reaction of $SiCl_4$ with $NH_3$ in accordance with DE-A-3 829 503, instead further process steps (mechanical preparation) are necessary to establish the desired properties. Accordingly, the problem to be solved is to develop a process for producing sintering-active material for engineering ceramics from crude $Si_3N_4$ powders.

The first step in the production of sintering-active $Si_3N_4$ powders normally comprises size reduction of the $Si_3N_4$ starting materials. Depending on its fineness, the product is first subjected to preliminary size reduction in crushers, sieve-equipped ball mills and/or jet mills [B. Hoffman, Keram. Z. 40 (1988) [2]90–86]. However, to achieve the extremely high finenesses required, wet grinding in stirred ball mills or ring ball mills is used as the final grinding stage. The grinding process may be carried out in aqueous or organic media in $Si_3N_4$-lined mills with $Si_3N_4$ balls or in steel-lined mills with steel balls.

Where grinding is carried out with steel balls, the iron dust formed has to be removed by subsequent leaching and washing processes. By contrast, $Si_3N_4$ materials are very expensive and, at the present time, are economically impractical. In addition, the suspension cannot simply be dried in this process either because the oxygen contents of the ceramic powders become unacceptably high through hydrolysis reactions during the mixing of the $Si_3N_4$. Accordingly, the $SiO_2$ has to be removed in both processes. This is normally done by subsequent washing with hydrofluoric acid which involves major safety problems. The hydrofluoric acid converts the $SiO_2$ into soluble fluorosilicic acid. By contrast, the solubility of $SiO_2$ in other mineral acids is only about 150 mg/l and, in water, of the order of 60 to 100 mg/l [R. K. Iler in "The Chemistry of Silica", John Wiley & Sons (1979) 40].

Hitherto, solid/liquid separation of the powder also presented major problems in view of the fineness of the $Si_3N_4$. The powder cannot be directly dried because the dissolved impurities would reprecipitate onto the powder. By contrast, in the case of filtration, the fine particles very quickly block the pores of the filter which results in extremely long filtration times. Possible alternatives would be, for example, a centrifuge or sedimentation and subsequent decantation of the suspension. The major disadvantage in this regard lies in the fact that the powder can only be subjected to one dilution wash so that several washing cycles are necessary.

The problem addressed by the present invention was to provide a process which would not have any of the disadvantages of the prior art.

It has now been found that the desired powder properties can be obtained by a process which, surprisingly, still enables the wet grinding step to be carried out in stirred ball mills or ring mills, even in aqueous suspension, but eliminates the need for leaching with hydrofluoric acid.

Accordingly, the present invention relates to a process for the production of sintering-active $Si_3N_4$ powders by mechanical preparation of the $Si_3N_4$ starting material, in which the $Si_3N_4$-containing starting material is size-reduced by wet grinding in an aqueous suspension and the suspension or powder is subjected to leaching with fluorine-free mineral acids and the $Si_3N_4$ powder thus purified is separated off.

The grinding suspension is normally cooled during grinding. However, it has surprisingly been found that an oxygen reduction of the order of 0.2 to 0.3% by weight is obtained by heating the grinding suspension to temperatures of 30° to 90° C. and preferably to temperatures of 40° to 80° C. In one preferred embodiment of the process according to the invention, therefore, grinding is carried out at temperatures of 30° to 90° C. and preferably at temperatures of 40° to 80° C.

It has also been found that, despite the poor solubility of the $SiO_2$ in mineral acids, such as HCl for example, the oxygen content of the ceramic powder can be kept relatively low by subsequent leaching in mineral acids and can be influenced through the concentration of the mineral acid. This is all the more surprising insofar as the solubility of $SiO_2$ in the acidic range is almost independent of the pH value.

Hydrochloric acid and/or sulfuric acid is/are preferably used as the fluorine-free mineral acid(s). The quantity of fluorine-free mineral acids used should advantageously be selected so that the normality of the mineral acid used in the leaching suspension is from 0.001 to 4N and preferably from 0.1 to 2N. The temperature at which leaching is carried out is preferably in the range from 40° to 100° C. and, more preferably, in the range from 60° to 90° C.

It has surprisingly been found that, after leaching, the suspensions thus treated can be subjected without difficulty to solid/liquid separation by pressure filtration. A filter press is preferably used for this purpose. The advantages are, on the one hand, the much shorter time required for the solid/liquid separation and, on the other hand, the considerably more efficient displacement washing which is possible for completely removing the grinding dust.

In the process according to the invention, grinding may be carried out in various grinding units. Particularly good results are obtained with stirred ball mills or ring ball mills.

The process according to the invention enables the wet grinding of $Si_3N_4$ powders to be carried out even in aqueous suspensions without any need for subsequent treatment with hydrofluoric acid. Nevertheless, the increase in the oxygen content of the ceramic powder is still less than 1% by weight. The pressure filtration step represents a considerable saving of time compared with other solid/liquid separation techniques and provides for efficient washing of the filter cake.

The following Examples are intended to illustrate the invention without limiting it in any way.

EXAMPLES

Example 1

12 Batches of 1.25 kg $Si_3N_4$ powder (BET surface 4.9 $m^2/g$, as determined by the nitrogen one-point method (DIN 66 131)-O: 0.4%, Fe: 0.003%, 40% <1 μm) and 1 l water were ground for 65 minutes in a steel-lined 5-liter stirred ball mill. The grinding temperature was 70° C. Steel balls were used as the grinding beads. After grinding, 93% of the particles were smaller than 1 μm and the iron dust amounted to 2 to 3%, based on the $Si_3N_4$ powder used.

The batches were combined and, after the addition of 14 l water and 3.6 l concentrated hydrochloric acid, were leached for 1 hour at 80° C. The normality of the hydrochloric acid used in the leaching suspension was 1.45N, based on the liquid volume. Solid/liquid separation was carried out in a frame filter press with a filter volume of 15 l. The filter cake was then washed first with HCl and then with water. The powder thus prepared had a specific surface of 11.8 $m^2/g$. Its oxygen content was 0.9% by weight and its iron content 0.002%. Accordingly, the overall uptake of oxygen during the process was only 0.5% by weight.

Example 2

430 g $Si_3N_4$ powder were digested in 1 l water and ground for 2.7 hours in an ring ball mill with a polyurethane lining (RS 4, a product of Welte) and $Si_3N_4$ balls. Part of the suspension was concentrated by evaporation while the rest was leached for 1 hour at 80° C. in 1.8N hydrochloric acid suspension. The suspension was then filtered and the powder was dried. The oxygen content of the unleached sample was 2.3% by weight. Whereas the oxygen content of the leached sample was only 1.4% by weight. The starting powder had an oxygen content of 0.7% by weight.

Example 3

750 g $Si_3N_4$ powder were ground for 1 hour in 960 ml water in a steel-lined 5-liter stirred ball mill charged with steel grinding beads. The temperature of the grinding suspension was 70° C. After grinding, the suspension was diluted with 1 liter water and 300 ml concentrated hydrochloric acid were added. This was followed by leaching for 1 h at 80° C. in 1.6N hydrochloric acid suspension.

The suspension was then filtered and washed with water. The powder obtained had an oxygen content of 1.5%.

COMPARISON Example 3

The test described above was repeated under the same conditions and with the same starting material. On this occasion, however, the grinding suspension was cooled with water during grinding and the temperature was less than 30° C. At 1.8%, the oxygen content of the powder thus obtained was 0.3% higher than in the previous test.

Example 4

This test demonstrates the effect of the acid concentration during leaching on the oxygen content and the specific surface of the $Si_3N_4$ powder.

180 g $Si_3N_4$ powder (H. C. Starck, Grade S) were ground for 2.5 hours in 120 ml water in a steel-lined stirred ball mill, diluted with 200 ml water and subsequently halved. 93% of the particles in the grinding suspension were smaller than 1 μm. 100 ml concentrated hydrochloric acid were added to the first batch whereas only 17 ml were added to the second batch (corresponding to a 2.9N and 0.6N hydrochloric acid suspension). Both batches were then leached for 1 hour at 80° C., filtered, washed and dried. The first powder had a specific surface and an oxygen content of 34.0 $m^2/g$ and 2.9% by weight, respectively. By contrast, the corresponding values for the second powder were only 20.7 $m^2/g$ and 1.6% by weight, respectively.

Both powders were then subjected to a second leaching in 1.5N hydrochloric acid. The specific BET surface of the first powder was now still 28.7 $m^2/g$ for an oxygen content of 1.8% whereas the specific BET surface of the second powder was only 14.5 $m^2/g$ for an oxygen content of 1.4% by weight. The starting powder had a specific surface of 3.2 $m^2/g$ and an oxygen content of 0.9% by weight. Accordingly, the oxygen increase in the first test was 0.9% by weight and, in the second test, 0.5% by weight. At 0.05%, the iron content of the two powders was below the starting value of 0.085%.

What is claimed is:

1. A process for the production of low oxygen content $Si_3N_4$ powders by mechanical preparation of a $Si_3N_4$ starting material, comprising reducing the particle size of the $Si_3N_4$ starting material by wet grinding in aqueous suspension at a temperature between 30° and 90° C., subjecting the resulting suspension or powder to leaching with a fluorine-free mineral acid at a temperature between 40° and 100° C., and separating off the $Si_3N_4$ powder thus purified.

2. A process as claimed in claim 1, wherein the grinding temperature is 40° to 80° C.

3. A process as claimed in claim 1, wherein hydrochloric acid, sulfuric acid or a mixture thereof is used as the fluorine-free mineral acid.

4. A process as claimed in claim 1, wherein the normality of the mineral acid used in the leaching suspension is 0.001 to 4N.

5. A process as claimed in claim 4, wherein the normality of the mineral acid is 0.1 to 2N.

6. A process as claimed in claim 1, wherein the leaching temperature is in the range of 60°-90° C.

7. A process as claimed in claim 1, wherein the purified powder is separated off by the pressure filtration.

8. A process as claimed in claim 7, wherein a filter press is used for the pressure filtration.

9. A process as claimed in claim 1, wherein the wet grinding step is carried out in stirred ball mills or ring ball mills.

* * * * *